(12) United States Patent
Jeon

(10) Patent No.: US 11,582,514 B2
(45) Date of Patent: Feb. 14, 2023

(54) SOURCE APPARATUS AND CONTROL METHOD THEREFOR

(71) Applicant: SAMSUNG ELECTRONICS CO., LTD., Suwon-si (KR)

(72) Inventor: Hyoungwoo Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 17/055,891

(22) PCT Filed: Feb. 11, 2019

(86) PCT No.: PCT/KR2019/001627
§ 371 (c)(1),
(2) Date: Nov. 16, 2020

(87) PCT Pub. No.: WO2019/235716
PCT Pub. Date: Dec. 12, 2019

(65) Prior Publication Data
US 2021/0227288 A1    Jul. 22, 2021

(30) Foreign Application Priority Data
Jun. 5, 2018   (KR) .................. 10-2018-0064712

(51) Int. Cl.
*H04N 21/443*    (2011.01)
*H04N 21/442*    (2011.01)
(Continued)

(52) U.S. Cl.
CPC ... *H04N 21/4432* (2013.01); *H04N 21/44204* (2013.01); *H04N 21/44222* (2013.01); *H04N 21/818* (2013.01); *H04N 21/84* (2013.01)

(58) Field of Classification Search
CPC ........ H04N 21/4432; H04N 21/44204; H04N 21/44222; H04N 21/818; H04N 21/84;
(Continued)

(56) References Cited

U.S. PATENT DOCUMENTS 9,032,463 B2   5/2015   Kim et al.
9,520,966 B2   12/2016  Loghin et al.
(Continued)

FOREIGN PATENT DOCUMENTS

JP    2005-173483 A    6/2005
JP    5414705 B2       2/2014
(Continued)

OTHER PUBLICATIONS

International Search Report (PCT/ISA/210) dated May 20, 2019 issued by the International Searching Authority in counterpart International Application No. PCT/KR2019/001627.
(Continued)

*Primary Examiner* — Nathan J Flynn
*Assistant Examiner* — Christine A Kurien
(74) *Attorney, Agent, or Firm* — Sughrue Mion, PLLC

(57) ABSTRACT

A source apparatus is disclosed. The apparatus includes a storage, a communicator, and a processor configured to, when the source apparatus being turned on while the source apparatus is turned off, identify an application related to a content included in the content reproduction history among a plurality of applications based on a content reproduction history stored in the storage, control the communicator to receive a content list provided by the application, and provide the content list by executing the application.

15 Claims, 15 Drawing Sheets

(51) Int. Cl.
*H04N 21/81* (2011.01)
*H04N 21/84* (2011.01)

(58) Field of Classification Search
CPC ........... H04N 21/4383; H04N 21/4532; H04N 21/485; H04N 21/4316; H04N 21/4431
See application file for complete search history.

(56) References Cited

U.S. PATENT DOCUMENTS

| | | | |
|---|---|---|---|
| 9,536,269 | B2 | 1/2017 | Chang et al. |
| 10,306,318 | B2* | 5/2019 | Lee .................. H04N 21/4532 |
| 2016/0006971 | A1* | 1/2016 | Yum .................. H04N 21/4622 348/564 |
| 2017/0180777 | A1 | 6/2017 | Phang et al. |
| 2018/0027295 | A1* | 1/2018 | Lee .................. H04N 21/4622 725/139 |
| 2018/0227639 | A1* | 8/2018 | Qi .................. H04N 21/4532 |
| 2019/0297388 | A1* | 9/2019 | Panchaksharaiah .................. H04N 21/4333 |

FOREIGN PATENT DOCUMENTS

| | | |
|---|---|---|
| KR | 10-0682254 B1 | 2/2007 |
| KR | 10-0722473 B1 | 5/2007 |
| KR | 10-2013-0009304 A | 1/2013 |
| KR | 10-1325242 B1 | 11/2013 |
| KR | 10-2014-0052387 A | 5/2014 |
| KR | 10-1454026 B1 | 10/2014 |
| KR | 10-2016-0003400 A | 1/2016 |
| KR | 10-2016-0039478 A | 4/2016 |
| KR | 10-2017-0072666 A | 6/2017 |
| KR | 10-2018-0010846 A | 1/2018 |

OTHER PUBLICATIONS

Written Opinion (PCT/ISA/237) dated May 20, 2019 issued by the International Searching Authority in counterpart International Application No. PCT/KR2019/001627.

Communication dated Apr. 1, 2022 issued by the Korean Intellectual Property Office in Korean English Application No. 10-2018-0064712.

* cited by examiner

FIG. 2B

| APP | CUMULATIVE USAGE TIME | |
|---|---|---|
| FIRST APP | TWO HOURS AND 15 MINUTES | |
| SECOND APP | THREE HOURS AND 28 MINUTES | ~~220 |
| THIRD APP | 45 MINUTES | |
| ⋮ | ⋮ | |

FIG. 3A

| DATE | TITLE | GENRE | HOURS OF REPRODUCTION | ETC |
|---|---|---|---|---|
| 18-04-20 | CONTENT A | DRAMA | 29 MINUTES | |
| 18-04-21 | CONTENT B | MOVIE | ONE HOUR AND 51 MINUTES | |
| 18-04-24 | CONTENT C | ENTERTAINMENT | 55 MINUTES | |
| 18-04-24 | CONTENT D | MOVIE | TWO HOURS AND ONE MINUTE | |
| ⋮ | ⋮ | ⋮ | ⋮ | ⋮ |

FIG. 3B

| GENRE | CUMULATIVE REPRODUCTION TIME | |
|---|---|---|
| MOVIE | 25 HOURS AND 38 MINUTES | ~310 |
| ENTERTAINMENT | 17 HOURS AND 15 MINUTES | |
| DRAMA | 16 HOURS AND 20 MINUTES | |
| NEWS | TWO HOURS | |
| ⋮ | ⋮ | |

SOURCE APPARATUS AND CONTROL METHOD THEREFOR

TECHNICAL FIELD

The disclosure relates to a source apparatus and a method of controlling thereof. More particularly, the disclosure relates to a source apparatus for executing an application and a method of controlling the same.

BACKGROUND ART

As network environment develops, consumer's content watching pattern is changing from terrestrial broadcasting through a broadcast tuner or content watching through a disk to content watching through a network streaming service. Accordingly, a development of electronic devices supporting network streaming services is expanding.

However, since conventional electronic devices supporting network streaming service are developed mainly for TV broadcasting or disk, which are existing functions, consumers should turn on the electronic device and search for a streaming service they want to watch through a main screen in order to access the network streaming service.

In this case, consumers who mainly use network streaming services have to search for streaming services whenever they want to watch content, and an extra time consumption was required.

In addition, there are electronic devices that provide a function that allows consumers to access the electronic device immediately after turning on the electronic device by placing a specific application button on a remote control, but if it is an application that consumers want, it was useless and only gives a discomfort by adding an unnecessary key on the remote control.

DETAILED DESCRIPTION OF THE INVENTION

Technical Problem

A purpose of the disclosure is to provide a source apparatus for more quickly executing an application desired by a user when the apparatus is turned on, and a method of controlling thereof.

Technical Solution

According to an embodiment of the disclosure, a source apparatus includes a storage, a communicator, and a processor configured to, when the source apparatus being turned on while the source apparatus is turned off, identify an application related to a content included in the content reproduction history among a plurality of applications based on a content reproduction history stored in the storage, control the communicator to receive a content list provided by the application, and provide the content list by executing the application.

The processor may be configured to identify an application related to at least one of a title or a genre of the content included in the content reproduction history among the plurality of applications.

The processor may be configured to receive a content list including at least one content related to at least one of the title or the genre of the content included in the content reproduction history.

The processor may be configured to identify an application that provides a content related to at least one of the title or the genre of the content.

The processor may be configured to identify at least one content among a plurality of contents included in the content reproduction history based on a number of content reproduction, a content reproduction time, and a content reproduction point in time, and identify an application related to the identified content.

The processor may be configured to store information on the application related to the identified content in the storage as initial execution information, and identify an application corresponding to the initial execution information based on the source apparatus being turned on.

The processor may be configured to, based on another content being identified among the plurality of contents, based on the content reproduction history, provide a guide on whether to set information on another application related to the another content as the initial execution information.

The apparatus may further include a display, wherein the processor is configured to control the display to display an execution screen of the application related to the content included in the content reproduction history.

The processor may be configured to store a history related to a content reproduced in an external content source as the content reproduction history.

The processor may be configured to identify an application that provides a content different from a plurality of contents stored in the storage.

According to an embodiment of the disclosure, a method of controlling a source apparatus includes the source apparatus being turned on while the source apparatus is turned off, identifying an application related to a content included in the content reproduction history among a plurality of applications based on a content reproduction history, receiving a content list provided by the application, and providing the content list by executing the application.

The identifying may include identifying an application related to at least one of a title or a genre of the content included in the content reproduction history among the plurality of applications.

The receiving may include receiving a content list including at least one content related to at least one of the title or the genre of the content included in the content reproduction history.

The identifying may include identifying an application that provides a content related to at least one of the title or the genre of the content.

The identifying may include identifying at least one content among a plurality of contents included in the content reproduction history based on a number of content reproduction, a content reproduction time, and a content reproduction point in time, and identifying an application related to the identified content.

Storing information on the application related to the identified content in the storage as initial execution information may be further included, and the identifying may include identifying an application corresponding to the initial execution information based on the source apparatus being turned on.

Based on another content being identified among the plurality of contents, based on the content reproduction history, providing a guide on whether to set information on another application related to the another content as the initial execution information may be further included.

Displaying an execution screen of the application related to the content included in the content reproduction history may be further included.

Storing a history related to a content reproduced in an external content source as the content reproduction history may be further included.

According to an embodiment of the disclosure, a non-transitory computer-readable medium including a program for executing a method of operating a source apparatus includes turning on the source apparatus while the source apparatus is turned off, identifying an application related to a content included in the content reproduction history among a plurality of applications based on a content reproduction history, receiving a content list provided by the application, and providing the content list by executing the application.

Effect of the Invention

According to various embodiments of the disclosure as described above, the source apparatus executes an application related to a content included in a content reproduction history among a plurality of applications based on the content reproduction history, thereby minimizing a user's manipulation and providing an automatically execute function.

BRIEF DESCRIPTION OF DRAWINGS

FIGS. 2A to 2C are views illustrating a method of setting an initially executed application according to various embodiments of the disclosure;

FIGS. 3A and 3B are views illustrating an operation based on a content reproduction history according to various embodiments of the disclosure;

BEST MODE FOR IMPLEMENTING THE DISCLOSURE

Mode for Implementing the Disclosure

Hereinafter, various example embodiments of the disclosure will be described in greater detail with reference to the accompanying drawings.

Figure 1A:
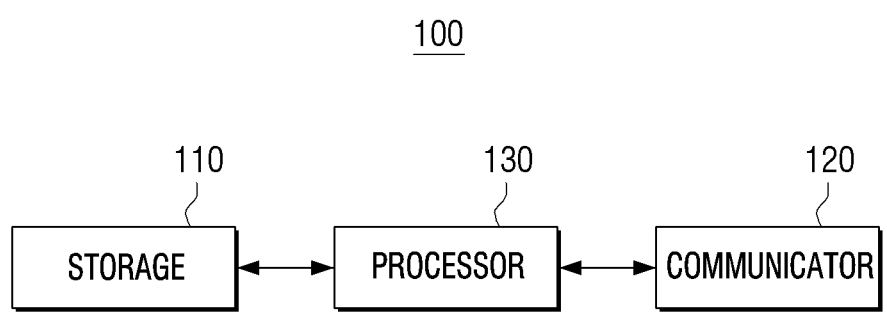
FIG. 1A is a block diagram illustrating an example of a configuration of a source apparatus.

FIG. 1A is a block diagram illustrating an example of a configuration of a source apparatus.

The source apparatus 100 may be an apparatus capable of executing a plurality of applications. For example, the source apparatus 100 may be an apparatus capable of executing a content providing application such as a drama application, a movie application, a music application, or the like. However, it is not limited thereto, and there is no particular limitation on the type of application.

The source apparatus 100 may be an apparatus that provides an execution screen of an application to an external display device, such as a set-top box (STB), a server, a BD player, a disk player, a streaming box, or the like. The source apparatus 100 may be an apparatus that provides not only an execution screen of an application but also a content reproduction screen to an external display device. The content may be previously stored in the source apparatus or may be received from the outside.

Alternatively, the source apparatus 100 may be an electronic device having a display such as a desktop PC, a notebook computer, a smartphone, a tablet PC, a TV, or the like, and directly displaying an execution screen of an application through the display. However, it is not limited thereto, and the source apparatus 100 may be any apparatus as long as it can execute an application.

Referring to FIG. 1A, the source apparatus 100 may include a storage 110, a communicator including circuitry 120, and a processor 130.

The storage 110 may store a content reproduction history. For example, the source apparatus 100 may store information on a reproduction time, a reproduction point in time, a channel, a title, a genre, etc. of the content requested to be reproduced by the user in the storage 110 as a content reproduction history. The source apparatus 100 may update the content reproduction history whenever the user requests to play a specific content.

Further, the storage 110 may store initial execution information. For example, when a drama application is stored in the storage 110 as initial execution information, the source apparatus 100 may execute a drama application corresponding to the initial execution information as the source apparatus 100 is turned on.

The storage 110 may be implemented as a hard disk, a non-volatile memory, a volatile memory, or the like, and any configuration may be used as long as it is a configuration capable of storing data.

The communicator 120 is a configuration for performing communication with the external apparatus. Specifically, the communicator 120 may receive content from a first external device and transmit a content reproduction screen and an application execution screen to a second external device. The first external device is an electronic device that stores a plurality of contents and provides contents to the source apparatus 100 according to a content request signal from the source apparatus 100, and the second external device is an electronic device including a display.

The processor 130 overall controls the operation of the source apparatus 100.

According to an embodiment, the processor 130 may be implemented as a digital signal processor (DSP), a microprocessor, or a time controller (TCON), but is not limited thereto, and may include one or more of a central processing unit (CPU), microcontroller unit (MCU), micro processing unit (MPU), controller, application processor (AP), or communication processor (CP), ARM processor, or may be defined as the corresponding term. In addition, the processor 130 may be implemented as a system on chip (SoC) or a large scale integration (LSI) in which a processing algorithm is embedded, or may be implemented in a form of a field programmable gate array (FPGA).

When the source apparatus 100 is turned on while the source apparatus 100 is turned off, the processor 130 may identify an application related to a content included in the content reproduction history among a plurality of applications based on the content reproduction history stored in the storage 110.

For example, when the source apparatus 100 is turned on while the source apparatus 100 is turned off, the processor 130 checks a genre of the content included in the content reproduction history stored in the storage 110, and may identify a drama application that provides a drama if the genre of the content is a drama.

The content reproduction history may be updated whenever there is a content reproduction request from the user. For example, when the user watches a movie, the processor 130 may store information on a reproduction time, a reproduction point in time, channel, title, genre, etc. of the watched movie as a content reproduction history.

The processor 130 may manage the content reproduction history in real time or at predetermined time intervals. For example, the processor 130 may store the content reproduction history from one week ago to the present in the storage 110, and delete the reproduction history after one week. Alternatively, the processor 130 may delete the reproduction history for which the predetermined time has elapsed among the content reproduction history at intervals of one hour. Alternatively, the processor 130 may delete the reproduction history for which the predetermined time has elapsed among the content reproduction history whenever the source apparatus 100 is turned on.

The processor 130 may sequentially store the content reproduction history in the storage 110. Alternatively, the processor 130 may sort and store the content reproduction history. For example, the processor 130 may divide the content reproduction history by genre, sum the cumulative reproduction time of the content for each genre, and store the sum result in the storage 110. In this case, when the content is additionally reproduced, the processor 130 may add the user's viewing time to the summed playing time corresponding to the genre of the reproduced content among data stored in the storage 110.

The processor 130 may control the communicator 120 to receive a list of contents provided by the identified application. For example, the processor 130 may transmit information on the identified application to an external device that provides content. In this case, the external device may provide the source apparatus 100 with a content list corresponding to the received application information.

When the content list is received, the processor 130 may provide the content list by executing an application. In this case, the processor 130 may transmit an application execution screen and a content list screen to the external display device. Alternatively, the processor 130 may directly display the application execution screen and the content list screen.

The processor 130 may identify an application related to at least one of a title or a genre of a content included in the content reproduction history among the plurality of applications. For example, when the source apparatus 100 is turned on, the processor 130 may identify a movie application that provides a movie from among the plurality of applications if the content included in the content reproduction history is a movie genre. Alternatively, when the source apparatus 100 is turned on, the processor 130 may identify a game application having a name similar to a title of the content included in the content reproduction history. In addition, the processor 130 may identify the application by further considering not only a title and a genre of the content, but also a main character, an author, a director, a location where the content was photographed of the content.

Also, the processor 130 may receive a content list including at least one content related to at least one of a title or a genre of content included in the content reproduction history. For example, when the source apparatus 100 is turned on, the processor 130 may receive a content list including at least one content of the same genre as the genre of the content included in the content reproduction history. In this case, the processor 130 may execute an application related to the content, and display the content list by overlaying the content list on the execution screen of the application.

Alternatively, the processor 130 may identify an application that provides content related to at least one of a title or a genre of the content. For example, when the source apparatus 100 is turned on, for example, the processor 130 may identify an application that provides content of the same genre as the genre of the content included in the content reproduction history.

Meanwhile, the processor 130 may identify at least one content of a plurality of contents included in the content reproduction history based on at least one of a number of content reproduction times, content reproduction time, or content reproduction point in time, and identify an application related to the identified content. For example, the content reproduction history may include information on which five contents have been reproduced, and when the source apparatus 100 is turned on, the processor 130 may identify a content with the longest reproducing time among the five contents, and identify an application related to the identified content. Hereinafter, for convenience of description, at least one identified content is mixed together with an expression of reference content.

Alternatively, the processor 130 may store information on the application related to the identified content as initial execution information in the storage 110 and identify an application corresponding to the initial execution information when the source apparatus 100 is turned on. For example, the processor 130 may not analyze the content reproduction history stored in the storage 110, but may identify an application to be executed in advance when the source apparatus 100 is turned on from the content reproduction history. Further, the processor 130 may store information on the determined application as initial execution information in the storage 110, and when the source apparatus 100 is turned on, execute the identified application based on the initial execution information to provide a content list.

The method of identifying the application to be executed in advance is the same as the method described above, and thus will be omitted.

The processor 130 may change initial execution information in real time. For example, when a cumulative reproduction time of a movie genre is the longest in the content reproduction history, and accordingly, a movie application is stored as initial execution information, if the user watches a drama, and a cumulative reproduction time of a drama genre exceeds the cumulative reproduction time of the movie genre, the processor 130 may store the drama application as initial execution information.

When another content is identified among the plurality of content based on the content reproduction history, the processor 130 may provide a guide on whether to set information on another application related to the other content as initial execution information.

In the above, it has been described that the source apparatus 100 is a device capable of providing content and executing an application regardless of whether or not a display is provided. For example, when the source apparatus 100 does not have a display, the source apparatus 100 may provide a content reproduction screen and an application execution screen to the display device.

Alternatively, the source apparatus 100 may further include a display, and the processor 130 may control the display to display an execution screen of an application related to the content included in the content reproduction history. In other words, the source apparatus 100 may have a display and may directly display the content reproduction screen and the application execution screen.

Alternatively, the source apparatus 100 may be a device that has a display, but cannot reproduce content or run an application. In other words, the source apparatus 100 may be a device that receives a content reproduction screen and an application execution screen from an external content source.

In this case, the processor 130 may store a history related to content reproduced from the external content source as a content reproduction history. Further, the processor 130 may request to reproduce content or execute an application from the external content source based on the content reproduction history.

Meanwhile, the processor 130 may identify an application that provides content different from a plurality of contents stored in the storage 110. For example, when the source apparatus 100 is a BD player, the processor 130 may identify an application that provides content different from the content stored on the Blu-ray disc.

In this case, the processor 130 may identify an application that provides content of a genre different from the genre of the content stored on the Blu-ray disc. For example, when movie content is stored on the Blu-ray disc, the processor 130 may identify an application that provides drama content.

However, it is not limited thereto, and the processor 130 may identify an application that provides other content different from at least one of the main character, the author, the director, or the location where the content was photographed of the content stored in the storage 110.

Figure 1B:
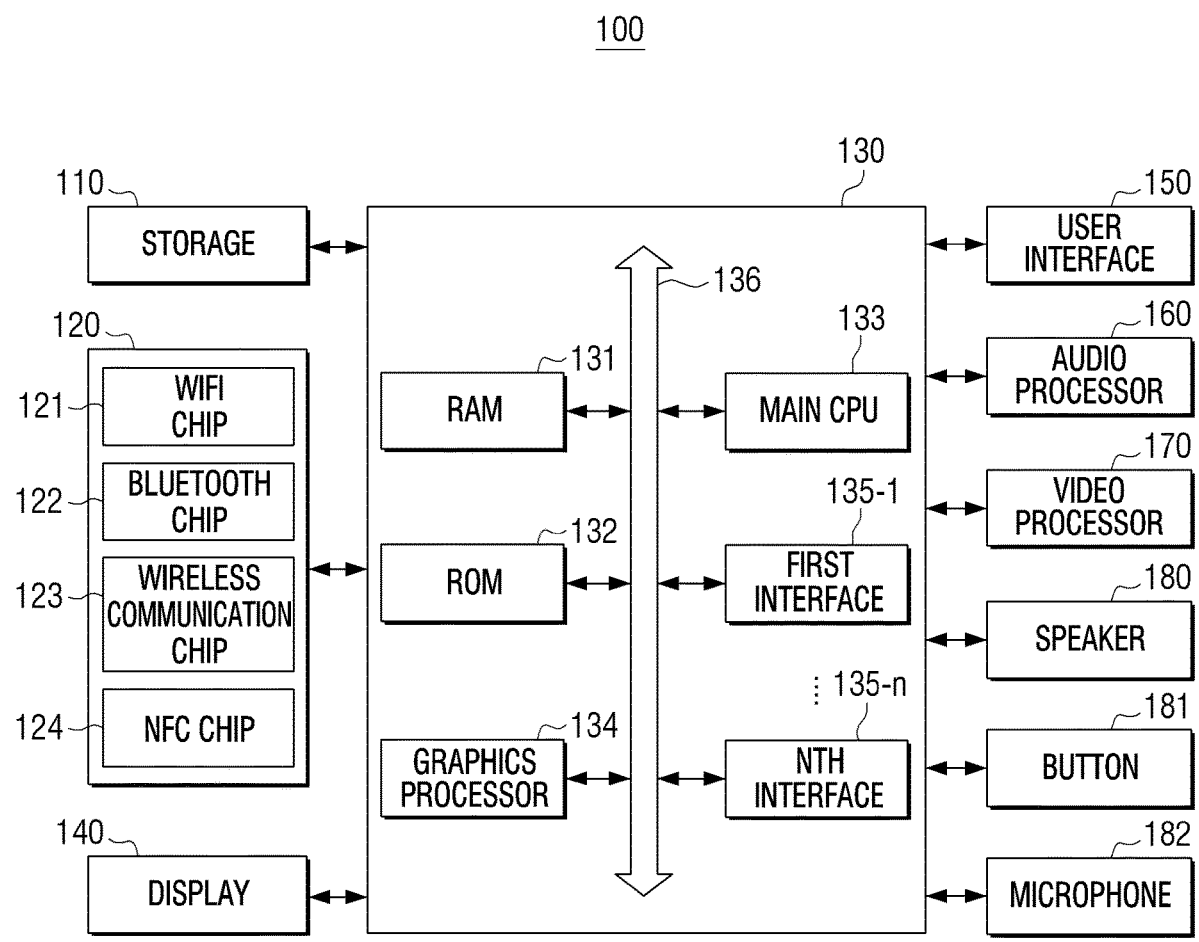
FIG. 1B is a block diagram illustrating an example of a detailed configuration of a source apparatus.

FIG. 1B is a block diagram illustrating an example of a detailed configuration of a source apparatus. The source apparatus 100 may include a storage 110, a communicator 120, and a processor 130. In addition, referring to FIG. 1B, the source apparatus 100 may further include a display 140, a user interface unit 150, an audio processor 160, a video processor 170, a speaker 180, a button 181, and a microphone 182. Detailed descriptions that overlap with the elements illustrated in FIG. 1A among the elements illustrated in FIG. 1B will be omitted.

The processor 130 may control the overall operations of the source apparatus 100 using various programs stored in the storage 110.

Specifically, the processor 130 includes a random-access memory (RAM) 131, a read-only memory (ROM) 132, a main central processing unit (CPU) 133, a graphic processor 134, a first to an n-th interface 135-1 to 135-n and a bus 136.

The RAM 131, the ROM 132, the main CPU 133, the graphic processor 134, the first to the n-th interface 135-1 to 135-n, etc. may be connected to each other through the bus 136.

The first to the nth interfaces (135-1 to 135-n) are connected to the above-described various elements. One of the interfaces may be network interface which is connected to an external apparatus via a network.

The main CPU 133 accesses the storage unit 110 to perform booting by using an O/S stored in the storage unit 110. In addition, the CPU 743 performs various operations using the various programs and data stored in the storage 110.

The ROM 132 may store a set of commands for system booting. If a turn on command is input and thus power is supplied, the main CPU 133 copies the O/S stored in the storage 110 to the RAM 131 and executes the O/S according to the command stored in the ROM 132, thereby booting the system. If the booting is completed, the main CPU 133 copies various application programs stored in the storage 110 to the RAM 131 and executes the application programs copied to the RAM 131, thereby performing various operations.

The graphic processor 134 generates a screen including various types of objects such as an icon, an image, a text, and the like by using an operator and a renderer. The operator (not illustrated) operates attribute values, such as coordinate values at which each object will be represented, forms, sizes, and colors according to a layout of the screen, based on the received control instruction. The renderer (not illustrated) creates screens of various layouts including the objects based on the attribute values which are operated by the operator (not illustrated). The screen generated by the rendering unit (not shown) may be displayed in a display area of the display 140.

The operation of the above-described processor 130 may be performed by a program stored in the storage 110.

The storage 110 stores various data, such as an O/S software module, to drive the user terminal apparatus 10, a contents reproduction module, a display UI module of various applications, etc.

The communicator 120 is an element to perform communication with various types of external devices according to various types of communication methods. The communicator 120 may include one or more of a Wi-Fi chip 121, a Bluetooth chip 122, a wireless communication chip 123, and an NFC chip 124. The processor 130 may perform the communication with various external devices by using the communication interface 120.

The Wi-Fi chip 121 and the Bluetooth chip 122 may perform communication using a Wi-Fi method and a Bluetooth method, respectively. In the case of using the Wi-Fi chip 121 or the Bluetooth chip 122, connection information such as a service set identifier (SSID) and a session key may be received and transmitted first, and communication may be connected using the connection information, and then, various information may be received and transmitted. The wireless communication chip 123 indicates a chip which performs communication in accordance with various communication standards such as IEEE, ZigBee, 3rd generation (3G), 3rd generation partnership project (3GPP), and long term evolution (LTE) or the like. The NFC chip 124 may refer to a chip that operates in a NFC manner using a frequency band of 13.56 MHz among various RF-ID frequency bands such as 135 kHz, 13.56 MHz, 433 MHz, 860 to 960 MHz, and 2.45 GHz.

In addition, the communicator 120 may further include a wired communication interface such as HDMI, MHL, USB, DP, Thunderbolt, RGB, D-SUB, and DVI. The processor 130 may be connected to an external device through a wired communication interface of the communicator 120. In this case, the processor 130 may receive a content reproduction screen or an application execution screen from an external device through a wired communication interface. Alternatively, the processor 130 may transmit the content reproduction screen or the application execution screen to the external device through the wired communication interface.

The display 140 may be implemented as various types of displays, such as a liquid crystal display (LCD), an organic light emitting diodes (OLED) display, and a plasma display panel (PDP). The display 140 may include a driving circuit, a backlight unit, or the like which may be implemented in forms such as an a-si TFT, a low temperature poly silicon (LTPS) TFT, an organic TFT (OTFT), or the like. The display 140 may be implemented as a touch screen including a touch sensor.

The user interface unit 150 receives various user interactions. Herein, the user interface unit 150 may be implemented in various forms according to implementing embodiments of the display apparatus 100. For example, the user interface unit 150 may be a button provided in the source apparatus 100, a microphone for receiving the user's voice, a camera for detecting the user's motion, or the like. Further, in response to the source apparatus 100 being implemented to be a terminal device based on touch, the user interface unit 150 may be implemented to be touch screen that forms an interlayer structure with a touch pad. The user interface unit 150 may be used as the above-described display 140.

The audio processor 160 is an element for processing audio data. The audio processor 160 may perform various types of processing, such as decoding, amplifying, noise filtering, or the like, with respect to the audio data.

The video processor 170 may process video data. The video processor 170 may perform various image processing operations such as decoding, scaling, noise filtering, frame rate conversion, and resolution conversion with respect to the video data.

The speaker 180 outputs various audio data processed by the audio processor 160 and various notification sounds or voice messages, etc.

The button 181 may include various types of buttons, such as a mechanical button, a touch pad, a wheel, etc., which are formed on the front, side, or rear of the exterior of a main body.

The microphone 182 is an element to receive a user voice or other sound and convert it to audio data.

Through the above method, when the source apparatus 100 is turned on, the processor 130 may execute an application related to the content included in the content reproduction history.

Hereinafter, the operation of the source apparatus 100 will be described in detail through drawings.

Figure 2A:
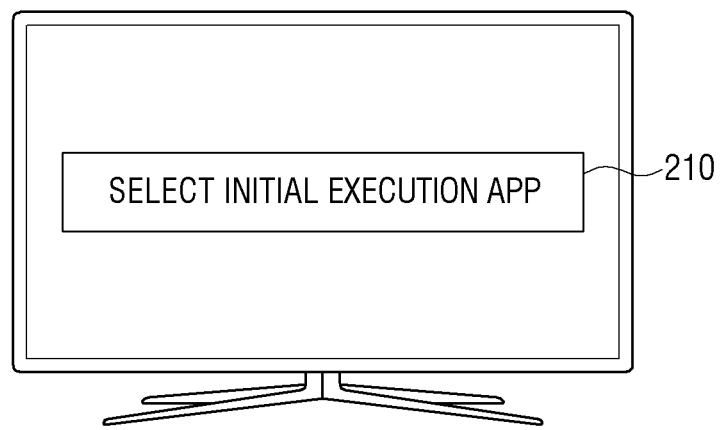
Figure 2C:
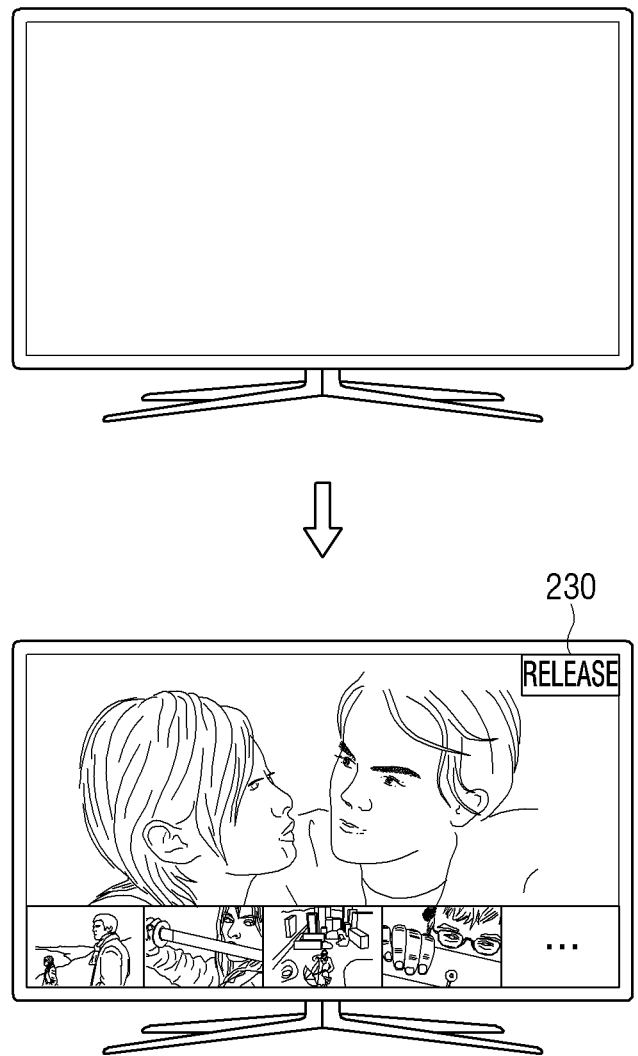

FIGS. 2A to 2C are views illustrating a method of setting an initially executed application according to various embodiments of the disclosure.

As shown in FIG. 2A, the processor 130 may display a guide phrase 210 that guides to selecting an initial execution application. When the source apparatus 100 is turned on, the processor 130 may display the guide phrase 210. For example, when the user first turns on the source apparatus 100, the processor 130 may display the guide phrase 210 through an out of box experience (OOBE) function. Alternatively, the processor 130 may display the guide phrase 210 only when the source apparatus 100 is turned on and the initial execution application is not set.

When a user command for setting the initial execution application is input while the guide phrase 210 is displayed, the processor 130 may display a list of a plurality of applications supported by the source apparatus 100. When the user selects one of them, the processor 130 may set the selected application as an initial execution application, and may execute the selected application when the source apparatus 100 is turned on.

Alternatively, the processor 130 may display a plurality of application lists according to the user command to enter a setting menu.

Alternatively, the initial execution application may be automatically set regardless of the user's setting command. For example, as shown in FIG. 2B, the processor 130 may store a usage history of an application provided by the source apparatus 100 in the storage 110. In addition, the processor 130 may automatically set the initial execution application based on a cumulated usage time for each application. In the case of FIG. 2B, the processor 130 may set an application 2 220 having the longest cumulative use time as an initial execution application.

However, it is not limited thereto, and the processor 130 may set an initial execution application based on the number of executions for each application. In this case, the processor 130 may store the number of executions for each application in the storage 110.

In addition, the processor 130 may set the initial execution application only when a minimum standard is satisfied. For example, when a minimum cumulative usage time is 4 hours, the processor 130 may not set application 2 of FIG. 2B as an initially executed application. Alternatively, a minimum number of executions is determined, and the processor 130 may set an application with the largest number of executions among applications exceeding the minimum number of executions as the initial execution application.

Alternatively, if the minimum standard is satisfied, the processor 130 may display a guide phrase guiding whether to designate the application as an initial execution application. For example, the processor 130 may store the number of executions for each application in the storage 110, and display a guide phrase guiding whether to designate a specific application as an initial execution application when the number of executions of a specific application exceeds the minimum number of executions.

When the user does not designate the specific application as the initial execution application, the minimum execution number of the specific application may be changed to a greater number of executions Meanwhile, the minimum standard may be set at the time of manufacturing the source apparatus 100, but may be set by the user.

Alternatively, the processor 130 may set the initial execution application based on at least one of a number of uses or a usage time of each application for a predetermined time. For example, the processor 130 may set an application with the largest number of uses from 24 hours before the source apparatus 100 is turned on to the time when the source apparatus 100 is turned on as an initial execution application.

Alternatively, the processor 130 may identify at least one of the number of uses or the usage time of each application based on a specific point in time, and may set an initial execution application according to a result of identification. For example, when the source apparatus 100 is turned on, the processor 130 may set an application having the longest usage time from midnight to the time when the source apparatus 100 is turned on as an initial execution application.

Alternatively, the processor 130 may set the initial execution application based on the number of executions for each application during a predetermined time from when the source apparatus 100 is turned on. For example, the processor 130 may store information on an application executed within one minute after the source apparatus 100 is turned on in the storage 110, and set the application with the largest number of times as an initial execution application.

Alternatively, the processor 130 may set an initial execution application based on a continuous usage time for each application. For example, if a movie application is continuously executed for 2 hours and a music application is continuously executed for 1 hour, the processor 130 may set the movie application as an initial execution application.

In this case, when another application is executed while the movie application is being executed, the execution of the movie application is stopped, and the movie application is executed again thereafter, the execution time may be initialized.

The processor 130 may set a plurality of applications as initial execution applications. In this case, the processor 130 may provide a plurality of application lists. Alternatively, the processor 130 may execute all of the plurality of applications, divide screens, and display an execution screen of each of the plurality of applications on each divided screen.

As shown in FIG. 2C, the processor 130 may provide a function of canceling the initial execution application. For example, when the source apparatus 100 is turned on, the processor 130 may execute the movie application set as an initial execution application and display an execution screen and a release icon 230 of the movie application.

FIGS. 2A to 2C describe the feature of setting an application, but are not limited thereto. For example, the processor 130 may set a USB reproduction function, a disk reproduction function, or the like as an initial execution function, and may execute a function set as an initial execution function when the source apparatus 100 is turned on.

FIGS. 3A and 3B are views illustrating an operation based on a content reproduction history according to various embodiments of the disclosure.

The processor 130 may store a content reproduction history in the storage 110. For example, the processor 130 may store a title, a genre, a content reproduction time, and a content reproduction point time, or the like of a content in the storage 110.

When the source apparatus 100 is turned on while the source apparatus 100 is turned off, the processor 130 may identify an application related to the content included in a content reproduction history among a plurality of applications based on the content reproduction history stored in the storage 110.

The processor 130 may identify at least one content from among a plurality of content included in the content reproduction history based on at least one of the number of content reproduction times or content reproduction point in time, and identify an application related to the identified content.

For example, when the source apparatus 100 is turned on, the processor 130 may identify an application related to a content D having the longest reproduction time from the content reproduction history stored in the storage 110. Alternatively, when the source apparatus 100 is turned on, the processor 130 may identify an application related to a movie genre, which is the most frequently played genre from the content reproduction history stored in the storage 110.

The processor 130 may identify an application related to at least one of a title or a genre of a content included in the content reproduction history among the plurality of applications. In the example described above, the processor 130 may identify an application that provides content having a title similar to the title of the content D (e.g., a sequel, another season of the same title, or the like). Alternatively, the processor 130 may identify a movie application related to a movie genre.

Alternatively, as shown in FIG. 3B, the processor 130 may sort and store the content reproduction history based on a predetermined reference. For example, the processor 130 may divide the content reproduction history by genre, sum the cumulated reproduction time of the content for each genre, and store the summation result in the storage 110. In this case, when the content is additionally reproduced, the processor 130 may add the user's reproduction time to the cumulated reproduction time corresponding to the genre of the reproduced content among data stored in the storage 110. When the source apparatus 100 is turned on, the processor 130 may identify an application related to the movie genre 310 having the longest cumulative reproduction time in the content reproduction history.

However, this is only an example, and the processor 130 may sort and store the content reproduction history according to any number of different standards.

Meanwhile, when the application is identified, the processor 130 may receive a content list provided by the application and execute the application to provide a content list. However, it is not limited thereto, and the processor 130 may immediately execute the application when the application is identified regardless of the reception of the content list.

Figure 4:
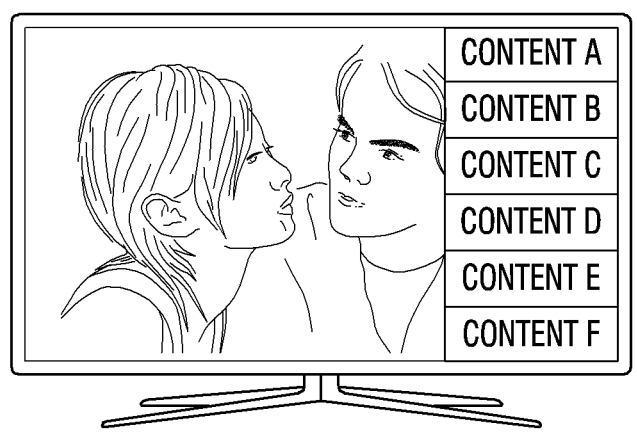
FIG. 4 is a view illustrating an application execution screen according to an embodiment of the disclosure.

FIG. 4 is a view illustrating an application execution screen according to an embodiment of the disclosure.

As illustrated in FIG. 4, the processor 130 may provide a content list including at least one content related to at least one of a title or a genre of content included in the content reproduction history. The content list may include content related to content included in the content reproduction history regardless of an application. Alternatively, the content list may include content related to content included in the content reproduction history among content provided by the application.

Figure 5A:
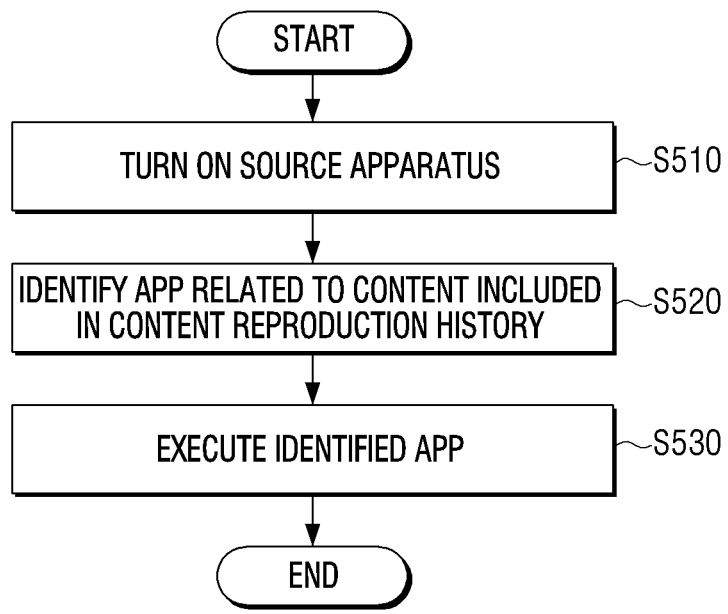
FIGS. 5A to 5C are views illustrating an application execution method according to an embodiment of the disclosure.
Figure 5B:
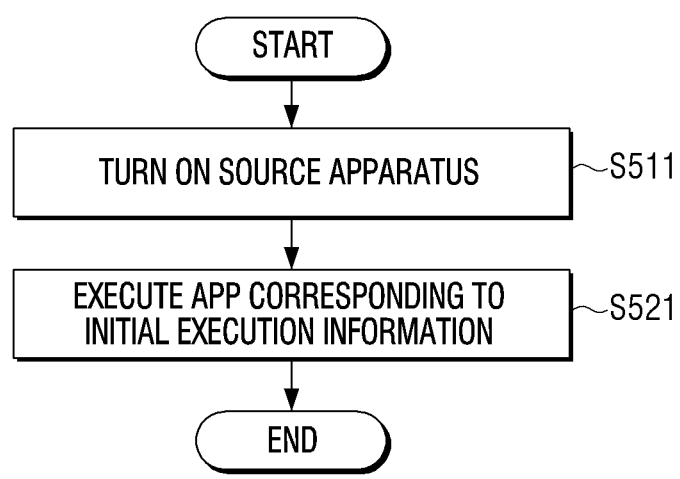
Figure 5C:
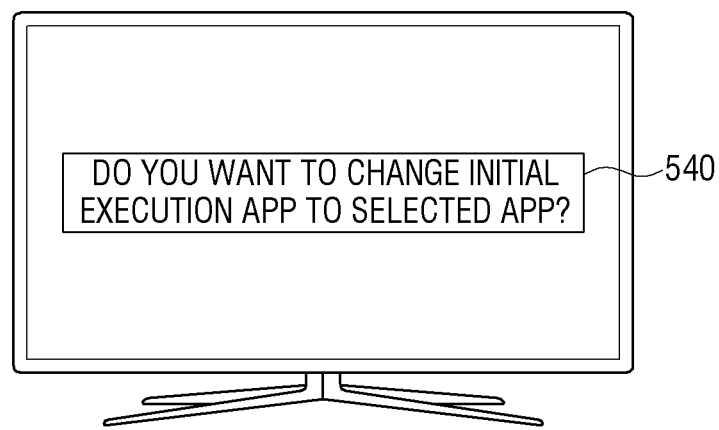

FIGS. 5A to 5C are views illustrating an application execution method according to an embodiment of the disclosure.

As shown in FIG. 5A, when the source apparatus 100 is turned on (S510), the processor 130 may identify an application related to the content included in the content reproduction history (S530). In other words, the processor 130 may identify a reference content based on the content reproduction history as shown in FIG. 3A or 3B and identify an application related to the identified reference content. Further, the processor 130 may execute the identified application (S530).

Alternatively, as shown in FIG. 5B, when the source apparatus 100 is turned on (S511), the processor 130 may execute an application corresponding to initial execution information (S521). In this case, the processor 130 may not perform an operation of identifying the reference content and an operation of identifying an application related to the identified reference content based on the content reproduction history.

However, the processor 130 may store a specific application in the storage 110 as initial execution information based on the content reproduction history. Specifically, the processor 130 may store information on the application related to the content identified based on the content reproduction history as initial execution information in the storage 110. Further, when the source apparatus 100 is turned on, the processor 130 may execute an application corresponding to the initial execution information.

Meanwhile, the processor 130 may provide a guide on whether to set information on the other application related to the other content as initial execution information when the other content is identified among a plurality of contents based on the content reproduction history.

For example, as shown in FIG. 5C, when the content reproduction history is changed according to the user's content watching and the reference content is changed, the processor 130 may identify an application related to the reference content, and when the identified application is different from the application corresponding to the initial execution information, the processor 130 may provide a guide 540 on whether to set the information on the identified application as the initial execution information.

The processor 130 may identify information the initial execution application in real time. For example, the processor 130 may cumulatively store usage time for each application in real time, and when an application with the longest usage time is changed, the processor may provide a guide for guiding whether to change the initial execution application to the user.

However, it is not limited thereto, and the processor 130 may provide a guide for guiding whether to change the initial execution application when the source apparatus 100 is turned on.

Meanwhile, only one reference content and one initial execution application have been described in the above, but the disclosure is not limited thereto. For example, the processor 130 may identify a plurality of contents from a content reproduction history, and store a plurality of applications corresponding to each of the plurality of contents in the storage 110 as initial execution information. Further, when the source apparatus 100 is turned on, the processor 130 may display a guide phrase that guides to selecting one of the plurality of applications corresponding to the initial execution information. Alternatively, when the source apparatus 100 is turned on, the processor 130 may execute all of the plurality of applications corresponding to the initial execution information, divide the screen, and display a plurality of application execution screens on the divided screens.

Alternatively, the processor 130 may perform other operations based on the number of the plurality of applications. For example, if the plurality of applications are three or less, the processor 130 may execute all of the plurality of applications with the turn-on of the source apparatus 100, display all execution screens of the plurality of applications, and if the number exceeds three, the processor 130 may display a guide phrase guiding to selecting one of the plurality of applications with the turn-on of the source apparatus 100.

In addition, the processor 130 may store the plurality of applications related to one reference content as initial execution information in the storage 110.

Figure 6:
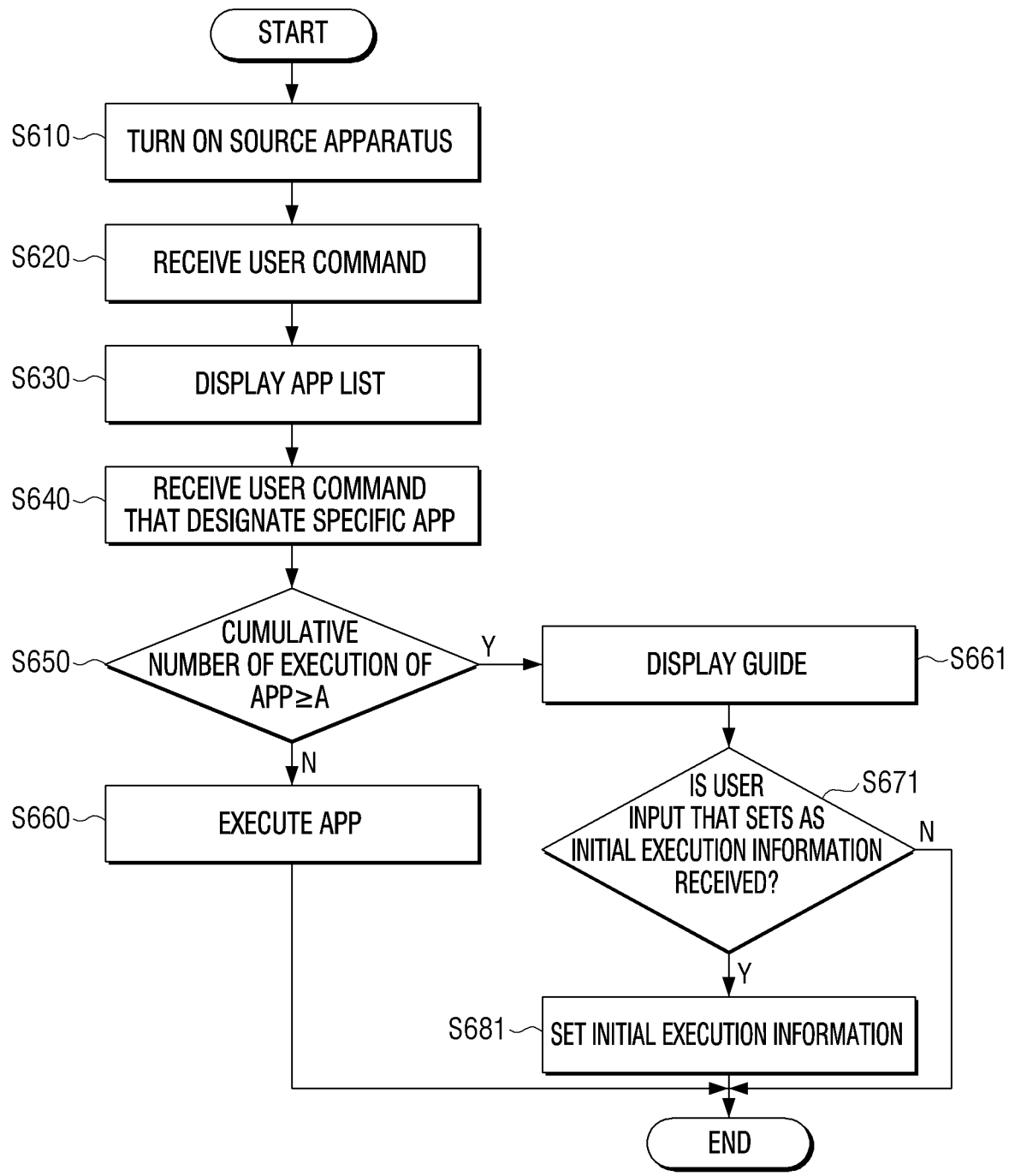
FIG. 6 is a flowchart illustrating a method of setting a real-time initial execution app according to an embodiment of the disclosure.

FIG. 6 is a flowchart illustrating a method of setting a real-time initial execution app according to an embodiment of the disclosure.

When the source apparatus 100 is turned on (S610) and a user command requesting an application list is received (S620), the processor 130 may display the application list (S630).

When a user command designating a specific application is received (S640), the processor 130 may compare a cumulative number of execution of the specific application with a specific number (a) (S650).

If the cumulative execution number of the specific application is less than the specific number (a), the processor 130 may execute the application without any other operation (S660).

If the cumulative execution number of the specific application is greater than or equal to the specific number (a), the processor 130 may display a guide for guiding whether to set the specific application as initial execution information (S661). Further, the processor 130 may identify whether a user input set as initial execution information is received (S671), and when the user input set as initial execution information is received, may set a specific application as initial execution information (S681).

The processor 130 may execute a specific application after setting the specific application as initial execution information. Alternatively, the processor 130 may execute the specific application and display a guide for guiding whether to set the specific application as initial execution information.

Meanwhile, in FIG. 6, only the comparison of the cumulative execution number of an application with the specific number (a) is described, but is not limited thereto. For example, when a user command designating a specific application is received, the processor 130 may compare the cumulative execution time of the specific application with the specific time.

If the cumulative execution time of the specific application is less than the specific time, the processor 130 may execute the application without any other operation. When the cumulative execution time of the specific application is more than the specific time, the processor 130 may display a guide for guiding whether to set the specific application as initial execution information.

Figure 7A:
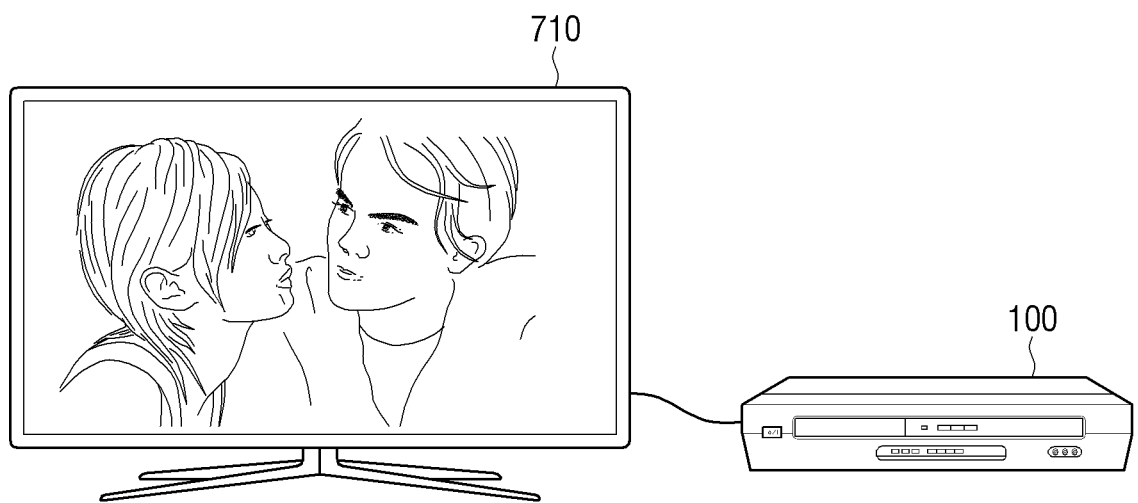
FIGS. 7A and 7B are views illustrating an extended embodiment of the disclosure.
Figure 7B:
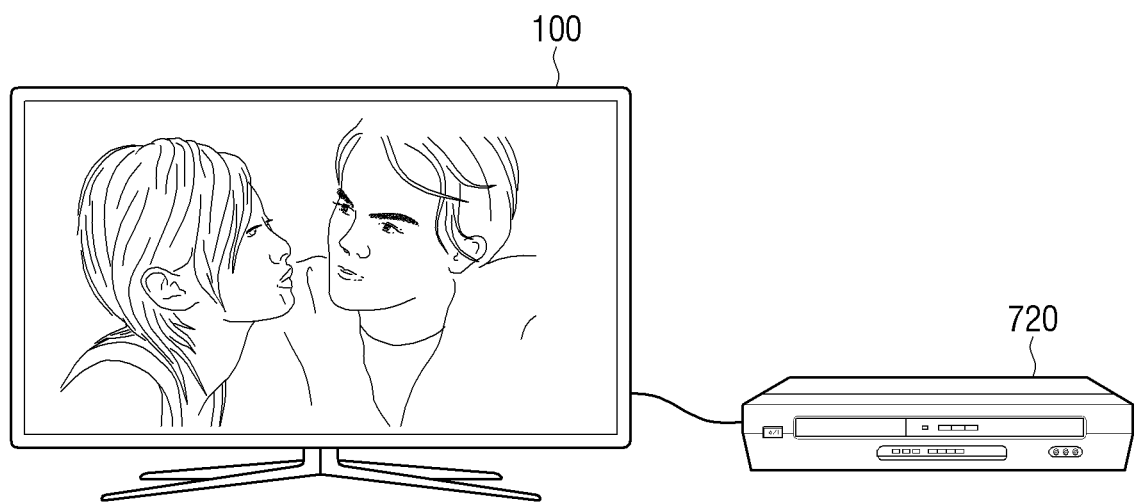

FIGS. 7A and 7B are views illustrating an extended embodiment of the disclosure.

In FIGS. 2A to 6, it has been described that the source apparatus 100 includes the display 140, and the processor 130 directly displays a content reproduction screen and an application execution screen through the display 140. In addition, it has been described that the processor 130 directly reproduces contents and directly executes applications.

However, it is not limited thereto, and as illustrated in FIG. 6A, the source apparatus 100 may be a device that does not have a display and provide a content reproduction screen or an application execution screen to an external display device 710. In this case, the source apparatus 100 may provide the content reproduction screen or the application execution screen to the external display device 710 and control to display a screen provided by the external display device 710. An operation of the other source apparatus 100 is the same as in FIGS. 2A to 6.

Alternatively, as illustrated in FIG. 6B, the source apparatus 100 may be a device that includes a display and receives a content reproduction screen or an application execution screen from the external electronic device 720 to display. In this case, the source apparatus 100 may store the content reproduction history received from the external electronic apparatus 720, the content reproduction history or the application execution history in the storage based on the application execution screen. In other words, the source apparatus 100 may store a history related to content played from an external content source as a content reproduction history. In addition, when the source apparatus 100 is turned on, the source apparatus 100 may transmit information on an application to be executed to the external electronic device 720 and receive the application execution screen from the external electronic device 720. The operation of the other source apparatus 100 is the same as in FIGS. 2A to 6.

Figure 8:
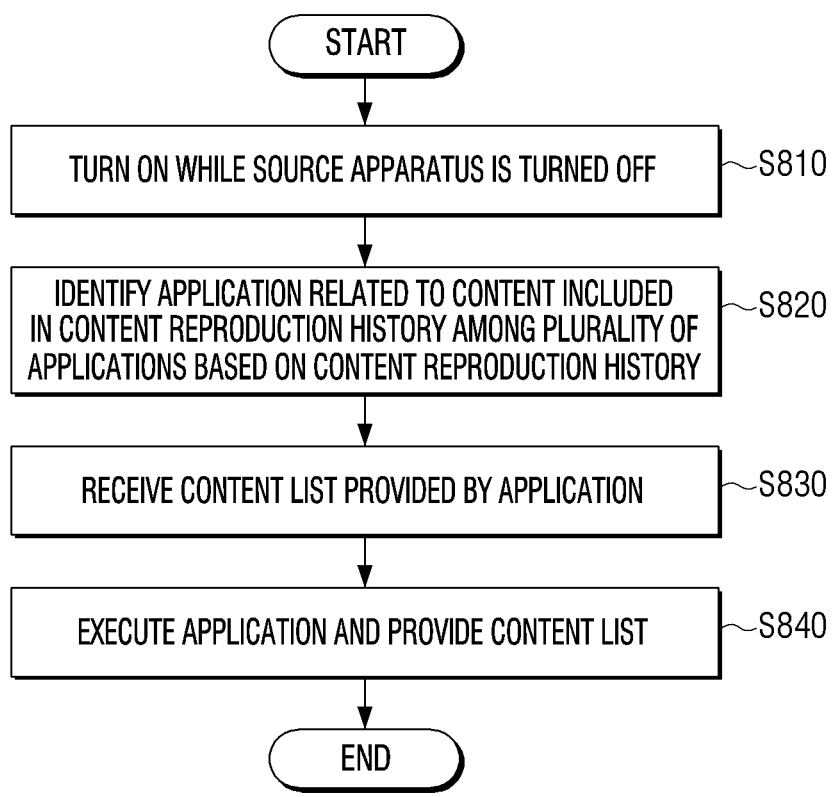
FIG. 8 is a flowchart illustrating a method of controlling a source apparatus according to an embodiment of the disclosure.

FIG. 8 is a flowchart illustrating a method of controlling a source apparatus according to an embodiment of the disclosure.

The source apparatus is turned on while the source apparatus is turned off (S810). The apparatus identifies an application related to a content included in a content reproduction history among a plurality of applications based on the content reproduction history (S820), receive a content list provided by the application (S830), and executes the application to provide the content list (S840).

The identifying S820 may identify an application related to at least one of a title or a genre of a content included in a content reproduction history among a plurality of applications.

In addition, the receiving S830 may further include providing a content list including at least one content related to at least one of the title or the genre of the content included in the content reproduction history.

Alternatively, the executing (S820) may receive the content related to at least one of the title or the genre of the content.

Meanwhile, the identifying (S820) may identify at least one of a plurality of contents included in the content reproduction history based on at least one of the number of content reproduction, a content reproduction time or a content reproduction point in time, and identify an application related to the identified content.

It may further include an operation of storing information on the application related to the identified content as initial execution information, and identify an application corresponding to the initial execution information when the source apparatus is turned on (S820).

In addition, when other content is identified among the plurality of contents based on the content reproduction history, providing a guide on whether to set information on the other application related to the other content as initial execution information may be further included.

Meanwhile, it may further include displaying an execution screen of an application related to content included in the content reproduction history.

It may further include storing a history related to the content played in the external content source as the content reproduction history.

According to various embodiments of the disclosure as described above, the source apparatus may execute the application related to the content included in the content reproduction history among the plurality of applications based on the content reproduction history, thereby minimizing the user's manipulation and providing an automatic execution function of an application that the user wants.

Meanwhile, an embodiment in which an application is automatically executed when the source apparatus is turned on has been described in the above, but is not limited thereto. For example, when the source apparatus is turned on, the processor may provide a guide for inquiring to continue watch a content previously watched through the application after execution of the application. Alternatively, when the source apparatus is turned on, the processor may automatically play content previously watched through the application after executing the application.

The various example embodiments described above may be implemented as an S/W program including an instruction stored on machine-readable (e.g., computer-readable) storage media. The machine is an apparatus which is capable of calling a stored instruction from the storage medium and operating according to the called instruction, and may include an electronic apparatus (e.g., an electronic apparatus A) according to the above-described example embodiments. When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

In addition, according to an embodiment of the disclosure, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

In addition, according to an embodiment of the disclosure, various embodiments described above may be implemented in a recording medium that may be read by a computer or a similar device to the computer by using software, hardware, or a combination thereof. In a software configuration, various embodiments described in the specification such as a procedure and a function may be embodied as separate software modules. The software modules may respectively perform one or more functions and operations described in the disclosure.

Meanwhile, computer instructions for performing a processing operation of a device according to the various embodiments described above may be stored in a non-transitory computer-readable medium. When a computer instruction stored in the non-transitory computer-readable medium is executed by a processor of a specific device, the instruction let a specific device perform a processing operation in the device according to the various embodiments described above. The non-transitory computer-readable medium refers to a medium that stores data semi-permanently and can be read by devices, rather than a medium that stores data for a short moment, such as registers, caches, memory, or the like. Specific examples of non-transitory computer-readable media may be CD, DVD, a hard disk, Blu-ray disk, USB, a memory card, ROM, or the like.

Further, each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A source apparatus comprising:
a storage;
a communicator; and
a processor configured to, based on the source apparatus being turned on, identify an application related to a content included in a content reproduction history among a plurality of applications based on the content reproduction history stored in the storage, control the communicator to receive a content list provided by the application, and provide the content list by executing the application,
wherein the processor is further configured to:
classify a plurality of contents into a plurality of groups based on a genre, each of the plurality of group corresponding to one of a plurality of genres;
identify cumulative reproduction time of the content for each of the plurality of genres by adding reproduction times of one or more contents that corresponds to the respective genre;
store the identified cumulative reproduction playback time in the storage of each of the plurality of genres; and
based on the source device being turned on, identify a genre, among the plurality of genres, which as a longest cumulative reproduction time among the stored cumulative reproduction time of each of the plurality of genres,
wherein the identified application provides a content of the identified genre, and
wherein the provided content list includes at least one content having the identified genre by executing the identified application.

2. The apparatus of claim 1, wherein the application is related to at least one of a title or a genre of the content included in the content reproduction history among the plurality of applications.

3. The apparatus of claim 2, wherein the content list including at least one content related to at least one of the title or the genre of the content included in the content reproduction history.

4. The apparatus of claim 2, wherein the application provides a content related to at least one of the title or the genre of the content.

5. The apparatus of claim 1, wherein the processor is configured to identify at least one content among the plurality of contents included in the content reproduction history based on a number of content reproduction, a content reproduction time, and a content reproduction point in time, and identify an application related to the identified content.

6. The apparatus of claim 5, wherein the processor is configured to store information on the application related to the identified content in the storage as initial execution information, and identify an application corresponding to the initial execution information based on the source apparatus being turned on.

7. The apparatus of claim 6, wherein the processor is configured to, based on another content being identified among the plurality of contents, based on the content reproduction history, provide a guide on whether to set information on another application related to the another content as the initial execution information.

8. The apparatus of claim 1, further comprising:
a display,
wherein the processor is configured to control the display to display an execution screen of the application related to the content included in the content reproduction history.

9. The apparatus of claim 1, wherein the processor is configured to store a history related to a content reproduced in an external content source as the content reproduction history.

10. The apparatus of claim 1, wherein the processor is configured to identify another application that provides a content different from a plurality of contents stored in the storage.

11. A method of controlling a source apparatus comprising:
based on the source apparatus being turned on, identifying an application related to a content included in a content reproduction history among a plurality of applications based on the content reproduction history; and
receiving a content list provided by the application, and providing the content list by executing the application
wherein the method further comprises:
classifying a plurality of contents into a plurality of groups based on a genre, each of the plurality of groups corresponding to one of a plurality of genres;
identifying cumulative reproduction time of the content for each of the plurality of genres by adding reproduction times of one or more contents that corresponds to the respective genre;
storing the identified cumulative reproduction playback time in the storage of each of the plurality of genres; and
based on the source device being turned on, identifying a genre, among the plurality of genres, which as a longest cumulative reproduction time among the stored cumulative reproduction time of each of the plurality of genres,
wherein the identified application provides a content of the identified genre, and
wherein the provided content list includes at least one content having the identified genre by executing the identified application.

12. The method of claim 11, wherein the application is related to at least one of a title or a genre of the content included in the content reproduction history among the plurality of applications.

13. The method of claim 12, wherein the content list includes at least one content related to at least one of the title or the genre of the content included in the content reproduction history.

14. The method of claim 12, wherein the application provides a content related to at least one of the title or the genre of the content.

15. The method of claim 11, wherein the identifying comprises identifying at least one content among the plurality of contents included in the content reproduction history based on a number of content reproduction, a content reproduction time, and a content reproduction point in time, and identifying an application related to the identified content.

\* \* \* \* \*